US011949355B2

United States Patent
Xiang et al.

(10) Patent No.: US 11,949,355 B2
(45) Date of Patent: Apr. 2, 2024

(54) VIBRATOR DRIVING METHOD, VIBRATION DRIVING SYSTEM, AND VIBRATION DRIVING EQUIPMENT

(71) Applicant: AAC Acousitc Technologies (Shanghai)Co., Ltd., Shanghai (CN)

(72) Inventors: Zheng Xiang, Shenzhen (CN); Xuan Guo, Shenzhen (CN)

(73) Assignee: AAC Acoustic Technologies (Shanghai)Co., Ltd., Shanghai (CN)

( * ) Notice: Subject to any disclaimer, the term of this patent is extended or adjusted under 35 U.S.C. 154(b) by 224 days.

(21) Appl. No.: 17/549,889

(22) Filed: Dec. 14, 2021

(65) Prior Publication Data

US 2022/0209699 A1   Jun. 30, 2022

(30) Foreign Application Priority Data

Dec. 25, 2020 (CN) .......................... 202011562122.1

(51) Int. Cl.
  *H02P 25/032* (2016.01)
  *G08B 6/00* (2006.01)

(52) U.S. Cl.
  CPC .............. *H02P 25/032* (2016.02); *G08B 6/00* (2013.01)

(58) Field of Classification Search
  CPC ......... B06B 3/00; B06B 1/16; B06B 2201/00; H02K 7/061; G01H 1/00; G01H 11/00; G08B 6/00; G01P 15/00; H02P 25/032; H02P 2209/13
  See application file for complete search history.

(56) References Cited

U.S. PATENT DOCUMENTS

| | | | |
|---|---|---|---|
| 6,940,680 B2 * | 9/2005 | Iwashiro ............ | G11B 5/59627 360/78.01 |
| 2012/0081104 A1 * | 4/2012 | Copley .................. | G01R 23/20 324/76.12 |
| 2018/0350339 A1 * | 12/2018 | Macours ............... | B06B 1/0253 |
| 2020/0047216 A1 * | 2/2020 | Xiang ................... | H02P 25/032 |

* cited by examiner

*Primary Examiner* — Said Bouziane
(74) *Attorney, Agent, or Firm* — W&G Law Group

(57) ABSTRACT

The present disclosure provides a vibrator driving method, including steps of: obtaining a preset vibration frequency and a resonant frequency of a target vibration motor; obtaining total harmonic distortion of the target vibration motor; obtaining at least one low distortion point of the target vibration motor according to the total harmonic distortion; obtaining a target vibration frequency according to a low distortion frequency of at least one low distortion point and the preset vibration frequency; driving the target vibration motor to vibrate according to the target vibration frequency. The present disclosure further provides a vibration driving system and a vibration driving equipment.

15 Claims, 5 Drawing Sheets

VIBRATOR DRIVING METHOD, VIBRATION DRIVING SYSTEM, AND VIBRATION DRIVING EQUIPMENT

FIELD OF THE PRESENT DISCLOSURE

The present invention relates to a vibration-driven technical field, in particular to a vibrator driving method, a vibrator driving system, and a vibration driving equipment incorporating the vibrator driving method.

DESCRIPTION OF RELATED ART

As an important human-computer interaction method, haptic feedback is playing an increasingly important role in modern society. Specific tactile feedback effects can play a diverse role, such as confirmation of touch operations of electronic devices, immersive experience vibrations in game scenes, and rich realistic tactile simulations. Wherein, in some vibration reminding scenes, such as incoming call vibration, etc., it is mainly for reminding users of events. the intensity of the vibration is often the most critical factor, and it is hoped that the greater the intensity of the vibration, the better. However, in some special haptic feedback application scenarios, such as simulating wind and water effects, some low-frequency long-vibration effects (that is, lower than the motor's resonant frequency) are usually required to achieve a continuous and low-frequency feel.

The frequency purity of the vibration is often the key to the quality of the effect, but in actual use scenes, there are often noises with high-frequency components in the single-frequency vibration, which affects the tactile experience.

SUMMARY OF THE PRESENT INVENTION

One of the objects of the present invention is to provide a vibrator driving method effectively reducing the distortion of a vibration motor vibration and improving the purity of the user's touch.

To achieve the above-mentioned objects, the present invention provides a vibrator driving method, comprising steps of:

obtaining a preset vibration frequency and a resonant frequency of a target vibration motor;

obtaining total harmonic distortion of the target vibration motor;

obtaining at least one low distortion point of the target vibration motor according to the total harmonic distortion;

obtaining a target vibration frequency according to a low distortion frequency of at least one low distortion point and the preset vibration frequency;

driving the target vibration motor to vibrate according to the target vibration frequency.

In addition, the step of obtaining the target vibration frequency according to the low distortion frequency of at least one of the low distortion point and the preset vibration frequency, comprises step of:

obtaining an absolute value of a difference between the preset vibration frequency and low distortion frequency of each low distortion point, and using the low distortion frequency corresponding to the smallest absolute value as the target vibration frequency.

In addition, the preset vibration frequency is lower than the resonant frequency of the target vibration motor.

In addition, low distortion frequency of at least one of the low distortion point comprises 7/24*resonant frequency and 5/12*resonant frequency.

In addition, the steps of obtaining the preset vibration frequency and the resonant frequency of the target vibration motor and obtaining total harmonic distortion of the target vibration motor include:

obtaining a digital drive signal, converting the digital drive into an analog driving signal, amplifying the analog driving signal to obtain a target driving signal, and inputting the target driving signal to the target vibration motor to drive the target vibration motor;

obtaining acceleration of a target tooling in a preset vibration direction, wherein the target vibration motor is attached to the target tooling;

obtaining the resonant frequency and the total harmonic distortion according to the target driving voltage corresponding to the target driving signal and the acceleration in the preset vibration direction.

In addition, the vibrator driving method further includes a step before the step of obtaining the preset vibration frequency and the resonant frequency of the target vibration motor:

obtaining a target vibration period, when the target vibration period exceeds the preset duration, executing the steps of obtaining the preset vibration frequency and the resonant frequency of the target vibration motor.

In addition, when the target vibration period does not exceed the preset duration, the preset vibration frequency is used as the target vibration frequency to drive the target vibration motor to vibrate.

The present invention further provides a vibration driving system, including: an obtaining module for obtaining a preset vibration frequency and a resonant frequency of a target vibration motor; a distortion module, for obtaining a total harmonic distortion of the target vibration motor, and for obtaining at least one low distortion point of the target vibration motor according to the total harmonic distortion; a vibration module, for obtaining a target vibration frequency according to the low distortion frequency of at least one of the low distortion point and the preset vibration frequency, and driving the target vibration motor to vibrate according to the target vibration frequency.

The present invention further provides a vibration driving equipment, including: a processor; a memory and communication circuit; wherein the processor is coupled to the memory and the communication circuit, a computer program is stored in the memory, and the processor executes a computer program to implement the method as described above.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby is only to explain the disclosure, not intended to limit the disclosure.

Figure 1:
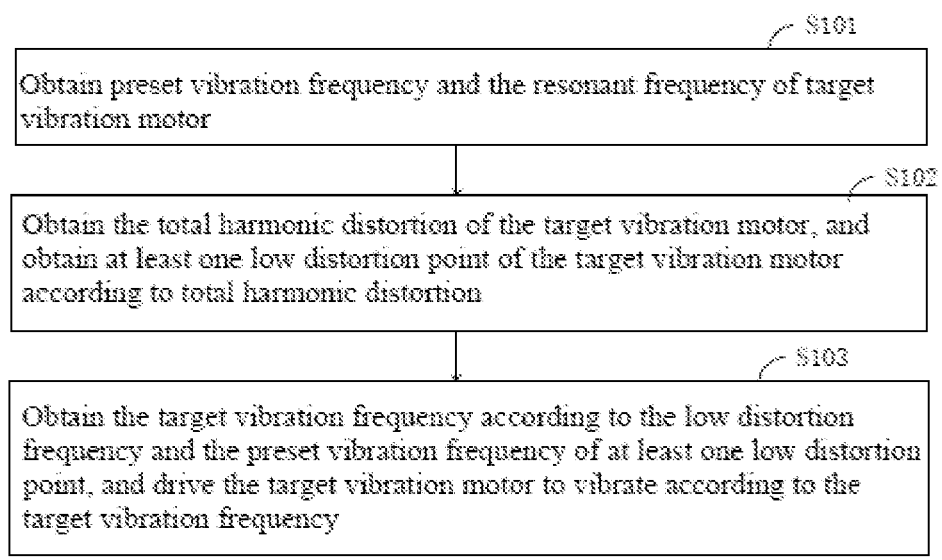
FIG. 1 is a flowchart of a vibrator driving method in accordance with a first embodiment provided by the present invention.

Please refer to FIG. 1. FIG. 1 is a schematic flowchart of a first embodiment of the vibrator driving method provided by the present invention. The vibrator driving method provided by the present invention comprises the following steps:

S101: Obtain preset vibration frequency and the resonant frequency of target vibration motor.

In a specific implementation scenario, the preset vibration frequency and preset vibration frequency can be obtained according to the preset vibration effect. For example, to simulate the vibration effect of wind blowing, the preset vibration frequency is A. To achieve the vibration effect of the simulated water flow, the preset vibration frequency is B. For obtaining resonant frequency of the target vibration, the resonant frequency can be obtained by measuring the target vibration motor in advance.

S102: Obtain the total harmonic distortion of the target vibration motor, and obtain at least one low distortion point of the target vibration motor according to total harmonic distortion.

Figure 2:
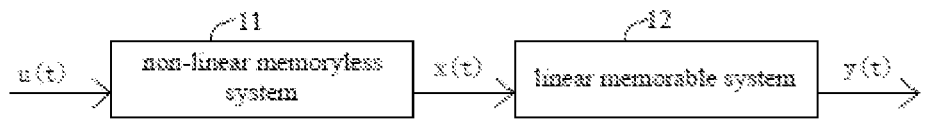
FIG. 2 is a schematic diagram of a target vibration motor provided by the present invention.

In a specific implementation scenario, for obtaining the total harmonic distortion of the target vibration motor, it can be obtained by measuring the target vibration motor in advance, or it can be obtained by calculating the relevant parameters of the target vibration motor. Please refer to FIG. 2 in combination. FIG. 2 is a schematic structural view of a target vibration motor provided by the present invention. The target vibration motor 10 is a non-linear system. The target vibration motor 10 comprises a non-linear memoryless system 11 and a linear memorable system 12. Wherein, u(t) is the input signal to the target vibration motor, and the output signal x(t) of the non-linear memoryless system 11 can be regarded as the Taylor polynomial form of the input signal u(t). This is a general polynomial expression to describe nonlinear characteristics; and the linear memorable system 12 usually has a maximum gain point at the resonant frequency (that is, f0) of the target vibration motor.

For the description of the degree of non-linearity of the motor, the traditional method of measuring the distortion of the motor is similar to the method of measuring the distortion in the acoustics, that is, the system is excited by a single frequency signal. The non-linearity of the system will produce high-order harmonics (that is, the multiplication component of the frequency signal). Express the THD (Total Harmonic Distortion, total harmonic distortion) corresponding to this frequency by the energy ratio between the higher order and the fundamental frequency. Then traverse different frequency points until the distortion test of all the frequency points of interest is completed. If the input signal is a single-frequency excitation with frequency f, the THD calculation formula is as follows:

$$THD = \sqrt{\frac{\sum_{n=2}^{5} P^2(nf)}{\sum_{n=1}^{5} P^2(nf)}}$$

Wherein, P(f) represents the frequency spectrum of the output signal of the target vibration motor.

Figure 3:
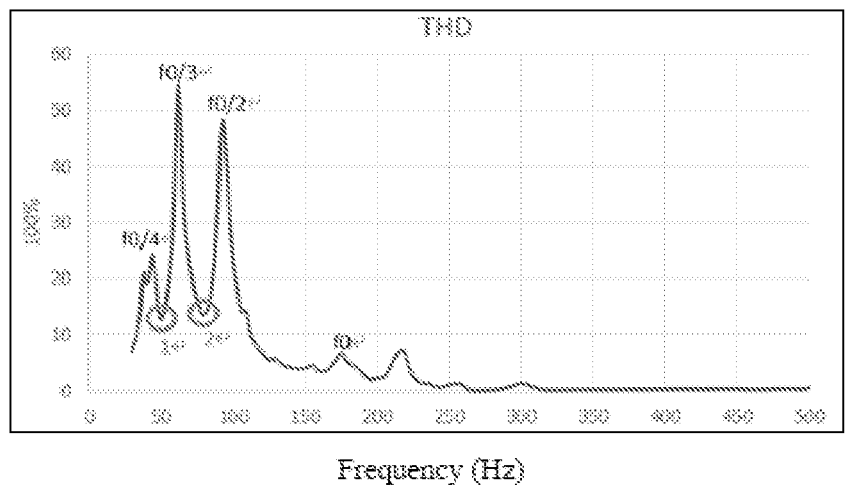
FIG. 3 illustrates a waveform of a total harmonic distortion of the target vibration motor.

Please refer to FIG. 3 in combination. FIG. 3 is a schematic view of the waveform of the total harmonic distortion of the target vibration motor provided by the present invention. As shown in FIG. 3, if THD is used to describe the distortion of the target vibration motor, the distortion of the target vibration motor at different frequencies will conform to the form shown in FIG. 3. It can be seen from FIG. 3 that at the frequency points of the motor f0/2, f0/3, f0/4 . . . , there will be a local peak point of THD, that is, a point with greater distortion. Generally speaking, at these frequency points, if it is driven with a single-frequency electrical signal, larger harmonic components will be generated: For example, the second harmonic will be generated at f0/2, the third harmonic will be generated at f0/3, and so on.

According to FIG. 3, it can be seen that the target vibration motor has lower distortion at the two frequency points in the circle (hereinafter referred to as circle 1 and circle 2), and these two frequency points are used as the low distortion point of the target vibration motor. In other implementation scenarios, it is also possible to select a frequency point in circle 1 or circle 2 as the low distortion point. For example, as shown in FIG. 3, if the total harmonic distortion of circle 1 is low, then circle 1 is used as the low distortion point of the target vibration motor.

S103: Obtain the target vibration frequency according to the low distortion frequency and the preset vibration frequency of at least one low distortion point, and drive the target vibration motor to vibrate according to the target vibration frequency.

In a specific implementation scenario, the low distortion frequency of at least one low distortion band is obtained, and the low distortion frequency of the low distortion point can be obtained through measurement or calculation. For example, the low distortion frequencies of these two low distortion points are 7f0/24 and 5f0/12 respectively. Please refer to Table 1 in combination. Table 1 is the information provided by the present invention corresponding to different frequency points of the THD curve shown in FIG. 3.

TABLE 1

| | Schematic in the picture | | | | | |
|---|---|---|---|---|---|---|
| | f0 | f0/2 | f0/3 | f0/4 | Circle 1 | Circle 2 |
| Physical meaning | resonant frequency | ½resonant frequency | ⅓resonant frequency | ¼resonant frequency | low distortion point 1 | low distortion point 2 |
| Calculation method | Individual measurement | f0/2 | f0/3 | f0/4 | 7f0/24 | 5f0/12 |
| Typical value | 170 Hz | 85 Hz | 57 Hz | 43 Hz | 50 Hz | 71 Hz |

As shown in Table 1, the low distortion frequencies of the two low distortion points are 50 Hz and 75 Hz, respectively. According to the preset vibration frequency, select low distortion frequency from at least one low distortion point as the target vibration frequency. For example, select the low distortion frequency closest to the preset vibration frequency as the target vibration frequency. Or calculate the target vibration frequency based on the low distortion frequency and preset vibration frequency of at least one low distortion point, including by using the average value, etc.

It can be seen from the above description that in this embodiment, obtain the target vibration frequency according to the total harmonic distortion of the target vibration motor, at least one low distortion point of the target vibration motor, and the low distortion frequency and the preset vibration frequency of at least one low distortion point. Drive the target vibration motor to vibrate according to the target vibration frequency, and drive the target vibration motor to vibrate with a signal with a lower distortion frequency. It can effectively reduce the distortion of the target vibration motor during vibration and improve the purity of the user's touch.

Figure 4:
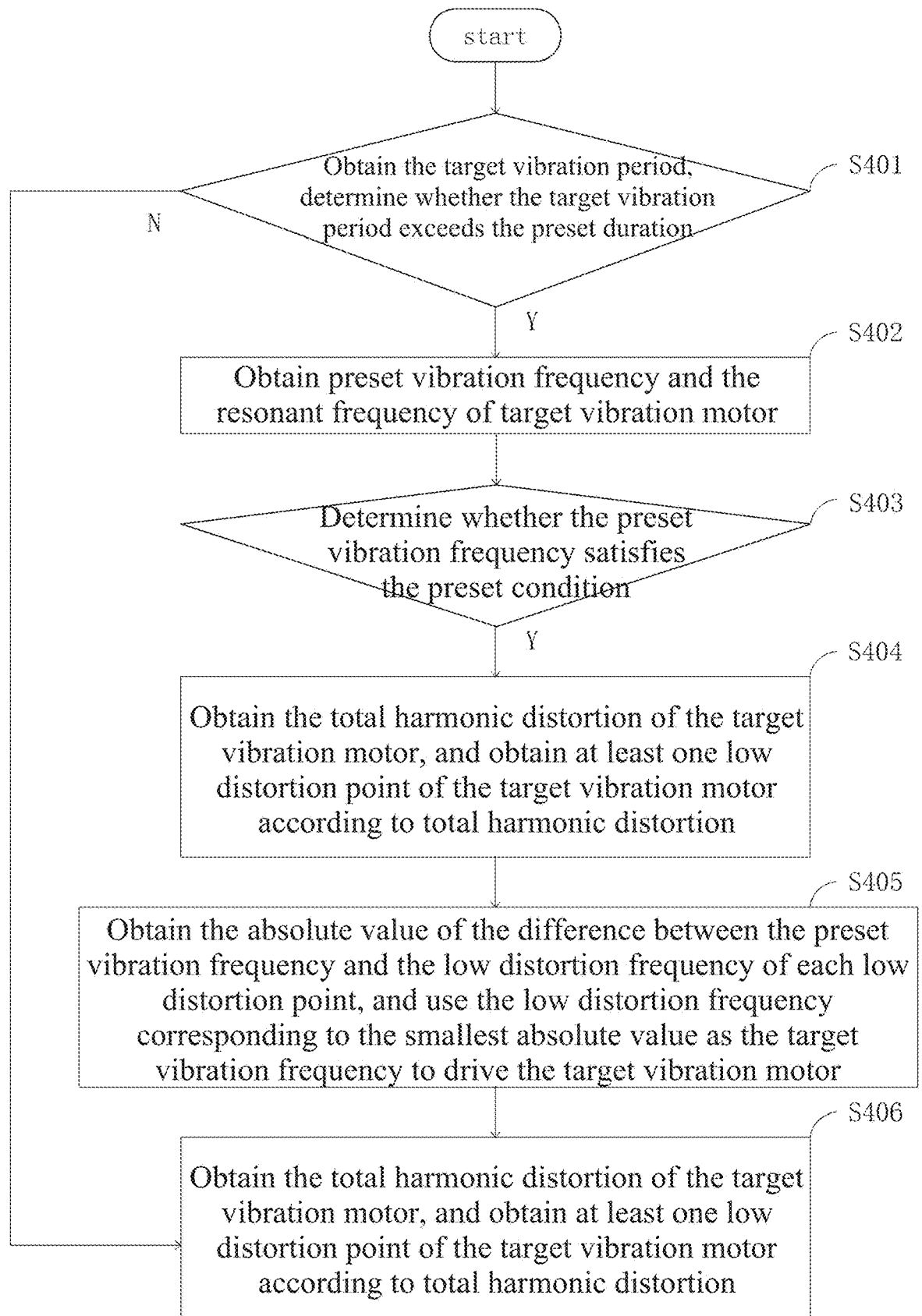
FIG. 4 is a flowchart of a vibrator driving method in accordance with a second embodiment provided by the present invention.

Please refer to FIG. 4, FIG. 4 is a schematic flowchart of a second embodiment of the vibrator driving method provided by the present invention. The vibrator driving method provided by the present invention comprises the following steps:

S401: Obtain the target vibration period, determine whether the target vibration period exceeds the preset duration, if it is, execute step S402, if not, execute step S406.

In a specific implementation scenario, because the low frequency vibration for a long time will cause more obvious distortion, if the time is short, the distortion will be less obvious. Therefore, set the preset duration and compare the target vibration period with the preset duration.

S402: Obtain preset vibration frequency and the resonant frequency of target vibration motor.

In a specific implementation scenario, step S402 is basically the same as step S101 in the first embodiment of the vibrator driving method provided by the present invention, and will not be repeated here.

S403: Determine whether the preset vibration frequency satisfies the preset condition, and if yes, step S404 is executed.

In a specific implementation scenario, in conjunction with FIG. 3, it can be seen that the preset vibration frequency should be at a frequency less than f0, otherwise the target vibration motor vibration cannot be obtained according to the low distortion frequency of at least one low distortion point. In addition, the preset vibration frequency must be a low frequency, because in long period, the low frequency vibration will cause more obvious distortion. In this implementation scenario, the preset vibration frequency is lower than 120 Hz.

S404: Obtain the total harmonic distortion of the target vibration motor, and obtain at least one low distortion point of the target vibration motor according to total harmonic distortion.

In a specific implementation scenario, step S404 is basically the same as step S102 in the first embodiment of the vibrator driving method provided by the present invention, and will not be repeated here.

S405: Obtain the absolute value of the difference between the preset vibration frequency and the low distortion frequency of each low distortion point, and use the low distortion frequency corresponding to the smallest absolute value as the target vibration frequency to drive the target vibration motor.

In a specific implementation scenario, obtain low distortion frequency of each low distortion point. For example, referring to Table 1, the low distortion frequencies of the two low distortion points are 50 Hz and 75 Hz, respectively. Calculate the absolute value of the difference between the preset vibration frequency and the low distortion frequency of each low distortion point. For example, if the preset vibration frequency is 90 Hz, the absolute value of the difference between circle 2 and the preset vibration frequency is the smallest. The low distortion frequency 75 Hz corresponding to circle 2 is used as the target vibration frequency to drive the target vibration motor to vibrate. For another example, if the preset vibration frequency is 60 Hz, the absolute value of the difference between the low distortion frequency 50 Hz corresponding to circle 1 and the preset vibration frequency is the smallest. The low distortion frequency 50 Hz corresponding to circle 2 is used as the target vibration frequency to drive the target vibration motor to vibrate.

Figure 5:
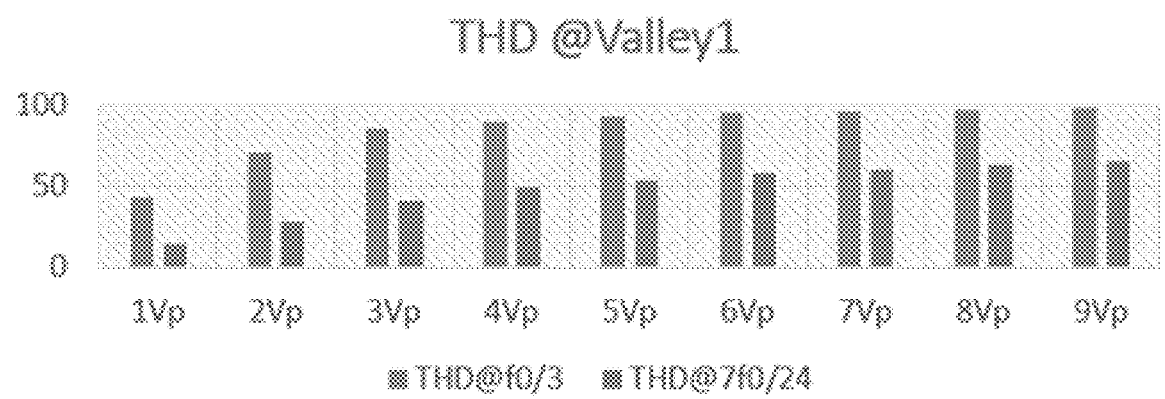
FIG. 5 is a comparative schematic view of the first embodiment of the total harmonic distortion of driving the target vibration motor with preset vibration frequency and low distortion frequency according to the present invention.
Figure 6:
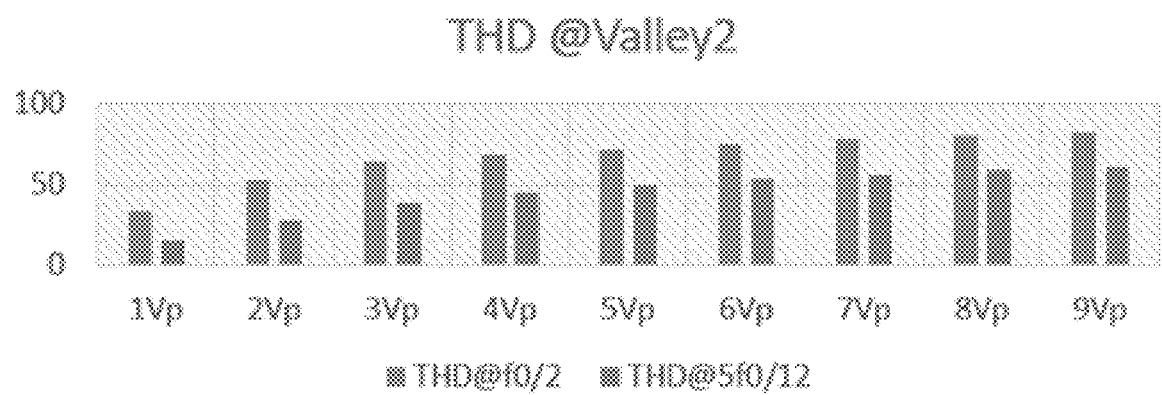
FIG. 6 is a comparative schematic view of the first embodiment of the total harmonic distortion of driving the target vibration motor with preset vibration frequency and low distortion frequency according to the present invention.

Please refer to FIG. 5 and FIG. 6 in combination. FIG. 5 is a comparison view of the first embodiment of the total harmonic distortion of driving the target vibration motor vibration with the preset vibration frequency and the low distortion frequency according to the present invention. FIG. 6 is a comparative schematic view of the first embodiment of the total harmonic distortion of the target vibration motor driven by the preset vibration frequency and the low distortion frequency provided by the present invention. In FIGS. 5 and 6, the column on the left of each node represents the total harmonic distortion that vibrates at the preset frequency, and the column on the right represents the total harmonic distortion that vibrates at the low distortion frequency. According to FIGS. 5 and 6, it can be understood that the distortion of each frequency point is effectively reduced by driving the target vibration motor to vibrate with the low distortion frequency.

S406: Use the preset vibration frequency as the target vibration frequency to drive the target vibration motor to vibrate.

In a specific implementation scenario, if the target vibration period does not exceed the preset duration and the distortion is not obvious, then use the preset vibration frequency as the target vibration frequency to drive the target vibration motor to vibrate to save resources and reduce time delay.

It can be seen from the above description that in this embodiment, the absolute value of the difference between the preset vibration frequency and the low distortion frequency of each low distortion point is obtained. The low distortion frequency corresponding to the smallest absolute value is regarded as the target vibration frequency, and the target vibration motor is driven by the low distortion frequency with lower distortion. It can effectively reduce the distortion of the target vibration motor during vibration and improve the purity of the user's touch.

Figure 7:
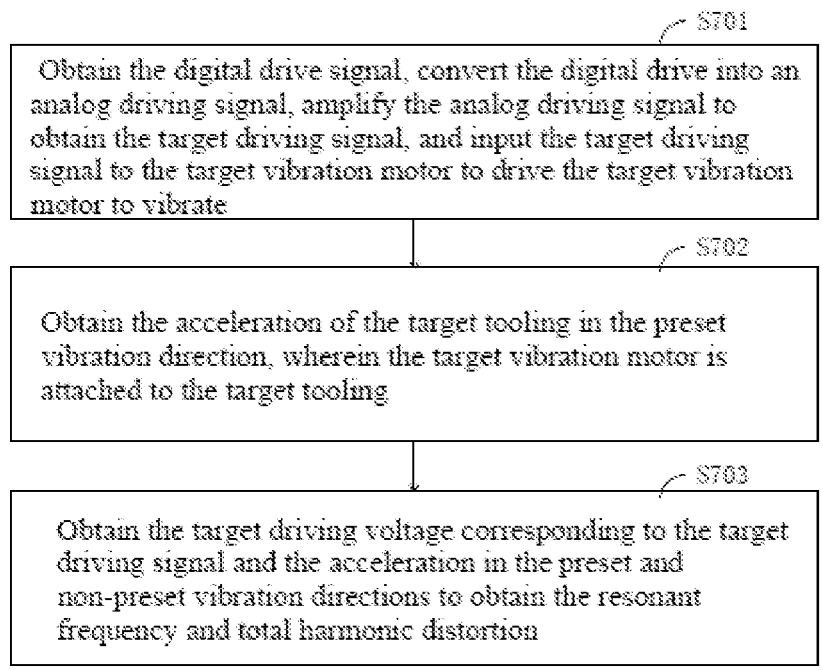
FIG. 7 is a schematic flowchart of a method for obtaining the resonant frequency and total harmonic distortion of a target vibration motor provided by the present invention.
Figure 8:
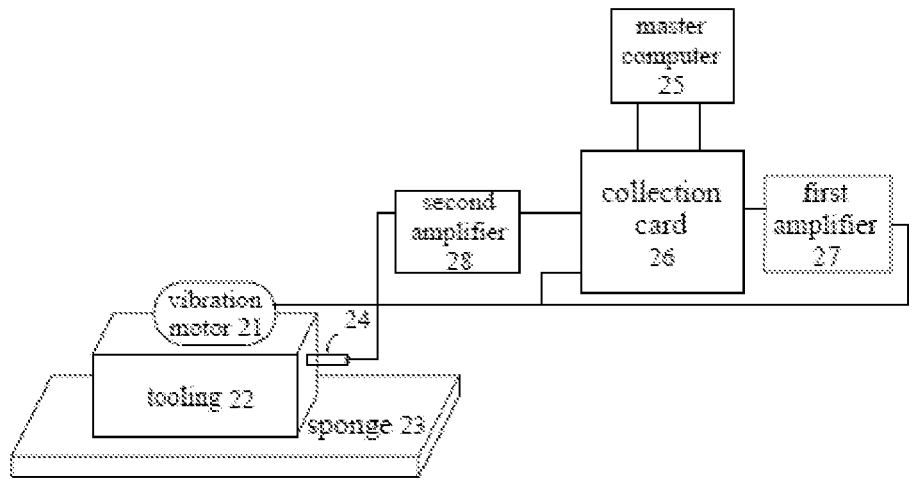
FIG. 8 is a schematic structural view of a device for obtaining the resonant frequency and total harmonic distortion of a target vibration motor provided by the present invention.

Please refer to FIG. 7 and FIG. 8 in combination. FIG. 7 is a flowchart of an embodiment of a method for obtaining the resonant frequency and total harmonic distortion of a target vibration motor provided by the present invention. FIG. 8 is a schematic structural view of an embodiment of a device for obtaining the resonant frequency and total harmonic distortion of a target vibration motor provided by the present invention.

S701: Obtain the digital drive signal, convert the digital drive into an analog driving signal, amplify the analog driving signal to obtain the target driving signal, and input the target driving signal to the target vibration motor to drive the target vibration motor to vibrate.

In a specific implementation scenario, as shown in FIG. 8, a digital drive signal is generated on the master computer 25, and the digital drive is sent to the collection card 26 for analog-to-digital conversion and converted into an analog driving signal. The analog driving signal is amplified by the first amplifier 27 to obtain the target driving signal. The target driving signal is input into target vibration motor 21 to drive target vibration motor 21 to vibrate.

S702: Obtain the acceleration of the target tooling in the preset vibration direction, wherein the target vibration motor is attached to the target tooling.

In a specific implementation scenario, the target vibration motor 21 and the tooling 22 are adhesively attached, and the tooling 22 is placed on the sponge 23 to avoid the influence of the environment on the measurement result. The three-axis accelerometer 24 is connected with the tooling 22 to measure the signal of the tooling 22 in the preset vibration direction of the target vibration motor 21.

S703: Obtain the target driving voltage corresponding to the target driving signal and the acceleration in the preset and non-preset vibration directions to obtain the resonant frequency and total harmonic distortion.

In a specific implementation scenario, the vibration of the target vibration motor 21 will drive the tooling 22 to vibrate in the opposite direction, then the three-axis accelerometer 24 detects and then the second amplifier 28 amplifies. The collection card 26 synchronously collects the target driving voltage corresponding to predicted target driving signal of the acceleration. Obtain the resonant frequency and total harmonic distortion according to the target driving voltage corresponding to the target driving signal and the acceleration in the preset vibration direction.

From the above description, it can be seen that in this embodiment, the resonant frequency and total harmonic distortion are obtained according to the target driving voltage corresponding to the target driving signal and the acceleration in the preset vibration direction. The whole system has a simple structure and a simple method and is easy to implement.

Figure 9:
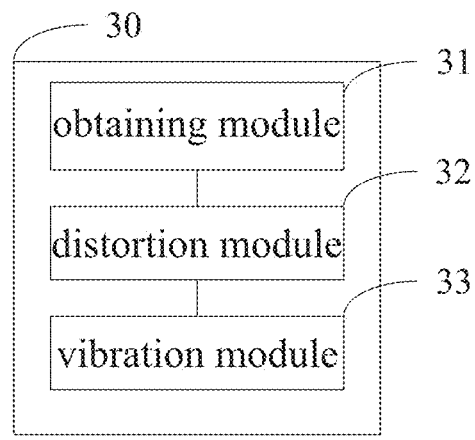
FIG. 9 is a schematic structural view of a vibration driving system provided by the present invention.

Please refer to FIG. 9, which is a schematic structural view of an embodiment of a vibration driving system provided by the present invention. The vibration driving system 10 comprises an obtaining module 31, a distortion module 32 and a vibration module 33.

The obtaining module 31 is used to obtain preset vibration frequency and the resonant frequency of target vibration motor. The distortion module 32 is used to obtain the total harmonic distortion of the target vibration motor, and obtain at least one low distortion point of the target vibration motor according to the total harmonic distortion. The vibration module 33 is used to obtain the target vibration frequency according to the low distortion frequency and the preset vibration frequency of at least one low distortion point, and to drive the target vibration motor to vibrate according to the target vibration frequency.

The vibration module 33 is also used to obtain the absolute value of the difference between the preset vibration frequency and the low distortion frequency of each low distortion point, and the low distortion frequency corresponding to the smallest absolute value is used as the target vibration frequency.

The preset vibration frequency is lower than the resonant frequency of the target vibration motor.

The low distortion frequency of at least one low distortion point includes 7/24*resonant frequency and 5/12*resonant frequency.

The distortion module 32 is also used to obtain the digital drive signal, convert the digital drive into an analog driving signal, amplify the analog driving signal to obtain the target driving signal, input the target driving signal to the target vibration motor to drive the target vibration motor to vibrate; obtain the acceleration of target tooling in the preset vibration direction, wherein the target vibration motor is attached to the target tooling; obtain the resonant frequency and total harmonic distortion according to the target driving voltage corresponding to the target driving signal and the acceleration in the preset vibration direction.

The obtaining module 31 is also used to obtain the target vibration period. If the target vibration period exceeds the preset duration, then execute the steps of obtaining the preset vibration frequency and the resonant frequency of the target vibration motor. If the target vibration period does not exceed the preset duration, use the preset vibration frequency as the target vibration frequency to drive the target vibration motor to vibrate.

It can be seen from the above description that in this embodiment, the vibration driving system obtains the target vibration frequency according to the total harmonic distortion of the target vibration motor, at least one low distortion point of the target vibration motor, and according to the low distortion frequency and the preset frequency vibration of at least one low distortion point. Drive the target vibration motor to vibrate according to the target vibration frequency. Driving the target vibration motor with low-distortion frequency signals can effectively reduce the distortion when the target vibration motor vibrates and improve the purity of the user's touch.

Figure 10:
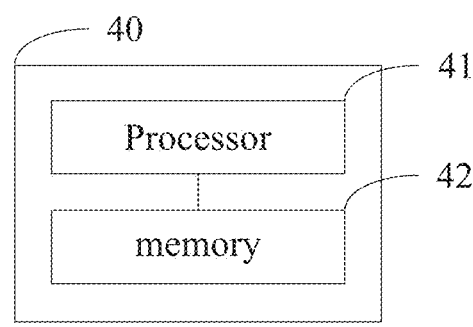
FIG. 10 is a schematic structural view of a vibration driving equipment provided by the present invention.

Please refer to FIG. 10, which is a schematic structural view of an embodiment of the vibration driving equipment provided by the present invention. The vibration driving equipment 40 comprises a processor 41 and a memory 42. The processor 41 is coupled to the memory 42. A computer program is stored in the memory 42, and the processor 41 executes the computer program when working to implement the methods shown in FIG. 1, FIG. 4, and FIG. 7. The detailed method can be referred to the above, and will not be repeated here.

It can be seen from the above description that in this embodiment, the vibration driving equipment obtains the target vibration frequency according to the total harmonic distortion of the target vibration motor, at least one low distortion point of the target vibration motor, and according to the low distortion frequency and the preset frequency vibration of at least one low distortion point. Drive the target vibration motor to vibrate according to the target vibration frequency, and drive the target vibration motor to vibrate with a signal with a lower distortion frequency, which can effectively reduce the distortion of the target vibration motor during vibration and improve the purity of the user's touch.

Figure 11:
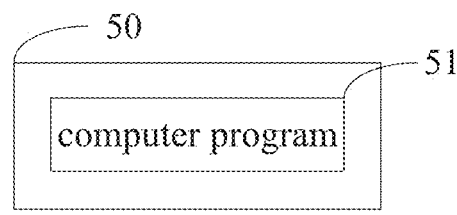
FIG. 11 is a schematic structural view of a storage medium provided by the present invention.

Please refer to FIG. 11. FIG. 11 is a schematic structural view of an embodiment of a storage medium provided by the present invention. At least one computer program 51 is stored in the storage medium 50, and the computer program 51 is used to be executed by the processor to implement the methods shown in FIG. 1, FIG. 4, and FIG. In an embodiment, the storage medium may be a storage chip in a terminal, a hard disk, or a mobile hard disk, or other readable and writable storage tools such as a USB flash drive, or an optical disk, and may also be a server etc.

According to the above description, in this embodiment, the computer program in the storage medium can be used to obtain the target vibration frequency according to the total harmonic distortion of the target vibration motor, at least one low distortion point of the target vibration motor, and according to the low distortion frequency and preset vibration frequency of at least one low distortion point. Drive the target vibration motor to vibrate according to the target vibration frequency, drive the target vibration motor to vibrate with a signal with a lower distortion frequency. This can effectively reduce the distortion of the target vibration motor vibration and improve the purity of the user's touch.

Those of ordinary skill in the art can understand that that the program completed by instructing the relevant hardware through the computer program can be stored in a non-volatile computer readable storage medium so as to realize all or part of the processes in the above-mentioned embodiment methods, When the program is executed, it may include the processes of the above-mentioned method embodiments. Wherein, any references to memory, storage, databases or other media used in the embodiments provided in this application can include non-volatile and/or volatile memory. Non-volatile memory may include read-only memory (ROM), programmable ROM (PROM), electrically programmable ROM (EPROM), electrically erasable programmable ROM (EEPROM), or flash memory. Volatile memory can include random access memory (RAM) or external cache memory. As an illustration and not a limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), synchronous chain Channel (Synchldnk) DRAM (SLDRAM), memory bus (Rambus) direct RAM (RDRAM), direct memory bus dynamic RAM (DRDRAM), and memory bus dynamic RAM (RDRAM), etc.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vibrator driving method, comprising steps of:
   obtaining a preset vibration frequency and a resonant frequency of a target vibration motor;
   obtaining total harmonic distortion of the target vibration motor;
   obtaining at least one low distortion point of the target vibration motor according to the total harmonic distortion;
   obtaining a target vibration frequency according to a low distortion frequency of at least one low distortion point and the preset vibration frequency;
   driving the target vibration motor to vibrate according to the target vibration frequency.

2. The vibrator driving method as described in claim 1, wherein the step of obtaining the target vibration frequency according to the low distortion frequency of at least one of the low distortion point and the preset vibration frequency, comprises step of:
   obtaining an absolute value of a difference between the preset vibration frequency and low distortion frequency of each low distortion point, and using the low distortion frequency corresponding to the smallest absolute value as the target vibration frequency.

3. A vibration driving equipment, including:
   a processor;
   a memory and communication circuit; wherein
   the processor is coupled to the memory and the communication circuit, a computer program is stored in the memory, and the processor executes a computer program to implement the method as described in claim 2.

4. The vibrator driving method as described in claim 1, wherein the preset vibration frequency is lower than the resonant frequency of the target vibration motor.

5. A vibration driving equipment, including:
   a processor;
   a memory and communication circuit; wherein
   the processor is coupled to the memory and the communication circuit, a computer program is stored in the memory, and the processor executes a computer program to implement the method as described in claim 4.

6. The vibrator driving method as described in claim 1, wherein low distortion frequency of at least one of the low distortion point comprises 7/24*resonant frequency and 5/12*resonant frequency.

7. A vibration driving equipment, including:
   a processor;
   a memory and communication circuit; wherein
   the processor is coupled to the memory and the communication circuit, a computer program is stored in the memory, and the processor executes a computer program to implement the method as described in claim 6.

8. The vibrator driving method as described in claim 1, wherein the steps of obtaining the preset vibration frequency and the resonant frequency of the target vibration motor and obtaining total harmonic distortion of the target vibration motor include:
   obtaining a digital drive signal, converting the digital drive into an analog driving signal, amplifying the analog driving signal to obtain a target driving signal, and inputting the target driving signal to the target vibration motor to drive the target vibration motor;

obtaining acceleration of a target tooling in a preset vibration direction, wherein the target vibration motor is attached to the target tooling;

obtaining the resonant frequency and the total harmonic distortion according to the target driving voltage corresponding to the target driving signal and the acceleration in the preset vibration direction.

9. A vibration driving equipment, including:

a processor;

a memory and communication circuit; wherein the processor is coupled to the memory and the communication circuit, a computer program is stored in the memory, and the processor executes a computer program to implement the method as described in claim 8.

10. The vibrator driving method as described in claim 1 further including a step before the step of obtaining the preset vibration frequency and the resonant frequency of the target vibration motor:

obtaining a target vibration period, when the target vibration period exceeds the preset duration, executing the steps of obtaining the preset vibration frequency and the resonant frequency of the target vibration motor.

11. The vibrator driving method as described in claim 10 further including a step after the step of obtaining the target vibration period, wherein:

when the target vibration period does not exceed the preset duration, the preset vibration frequency is used as the target vibration frequency to drive the target vibration motor to vibrate.

12. A vibration driving equipment, including:

a processor;

a memory and communication circuit; wherein the processor is coupled to the memory and the communication circuit, a computer program is stored in the memory, and the processor executes a computer program to implement the method as described in claim 11.

13. A vibration driving equipment, including:

a processor;

a memory and communication circuit; wherein the processor is coupled to the memory and the communication circuit, a computer program is stored in the memory, and the processor executes a computer program to implement the method as described in claim 10.

14. A vibration driving equipment, including:

a processor;

a memory and communication circuit; wherein the processor is coupled to the memory and the communication circuit, a computer program is stored in the memory, and the processor executes a computer program to implement the method as described in claim 1.

15. A vibration driving system, including:

an obtaining module for obtaining a preset vibration frequency and a resonant frequency of a target vibration motor;

a distortion module, for obtaining a total harmonic distortion of the target vibration motor, and for obtaining at least one low distortion point of the target vibration motor according to the total harmonic distortion;

a vibration module, for obtaining a target vibration frequency according to the low distortion frequency of at least one of the low distortion point and the preset vibration frequency, and driving the target vibration motor to vibrate according to the target vibration frequency.

* * * * *